Sept. 21, 1965　　F. C. I. MARCHANT ETAL　　3,206,929
AIRCRAFT JET PROPULSION NOZZLES Filed Jan. 11, 1962　　4 Sheets-Sheet 1

Inventor
Francis Charles Ivor Marchant
Robert William Jaggard

By Bailey, Stephens & Huettig
Attorneys

Sept. 21, 1965   F. C. I. MARCHANT ETAL   3,206,929
AIRCRAFT JET PROPULSION NOZZLES
Filed Jan. 11, 1962   4 Sheets-Sheet 4

Inventor
Francis Charles Ivor Marchant
Robert William Jaggard

By
Bailey, Stephens & Huettig
Attorneys

United States Patent Office 3,206,929
Patented Sept. 21, 1965

3,206,929
AIRCRAFT JET PROPULSION NOZZLES
Francis Charles Ivor Marchant and Robert William Jaggard, Bristol, England, assignors to Bristol Siddeley Engines Limited, Bristol, England, a company of Great Britain
Filed Jan. 11, 1962, Ser. No. 165,548
Claims priority, application Great Britain, Jan. 12, 1961, 1,343/61
8 Claims. (Cl. 60—35.55)

The invention relates to jet propulsion nozzle assemblies for use in aircraft, including nozzle and supply duct parts arranged for rotation relatively to one another so as to permit orientation of the jet direction relatively to the supply duct direction. The supply duct may be one which receives a flow of air, or one which receives a flow of exhaust gas from a gas turbine.

When such assemblies are used with a power plant which can be controlled to supply the jet fluid either at a normal temperature or at an increased temperature obtained by combustion of fuel or of additional fuel in the fluid, it is usually necessary, when the heating is brought into operation, to decrease the restriction caused by the nozzle so that the back pressure on the plant shall not be increased.

The present invention relates to arrangements for this purpose which are not affected by the rotational movements of the nozzle.

According to the invention both parts of the assembly include a main fluid flow passage and a secondary fluid flow passage, the main passage of the nozzle part having a throat, and like passages of both parts being in uninterrupted communication with one another throughout the range of relative rotation of the parts, and means are provided in the nozzle part capable, when supplied with fluid throughout the secondary passage, of causing a change in the restricting action of the throat.

In one form of the invention the restriction varying means are openings in a common boundary wall between the secondary fluid flow passage and the throat, arranged and directed to discharge fluid, supplied at an adequate pressure through the secondary fluid flow passage, across the throat in the form of a screen partially blocking the throat against fluid flow through the main passage.

The invention is particularly applicable to swivelling elbow nozzles having a cascade of deflector vanes forming throats at the elbow. In this case the vanes are hollow, forming part of the secondary fluid flow passage, and each is provided in its concave flank with a slit extending substantially parallel to its leading edge, the slit constituting a nozzle the discharge direction of which is inclined upstream.

In a second form of the invention the restriction varying means comprises an adjustable cascade of deflector vanes arranged in the elbow of a swivelling elbow nozzle, means responsive to pressure of fluid supplied through the secondary passage being provided for moving the vanes from a minimum throat area setting to a maximum throat area setting.

The secondary fluid flow passage may be interposed between a wall of the main fluid flow passage and bearing means supporting the nozzle part for rotation relatively to the supply duct part, so that cool air flowing through the secondary fluid flow passage can form a barrier to transmission of heat to the bearing means from hot gas flowing in the main fluid flow passage.

The accompanying drawings show examples of elbow nozzles according to the invention forming part of a gas turbine power unit. In the drawings.

Figure 1:
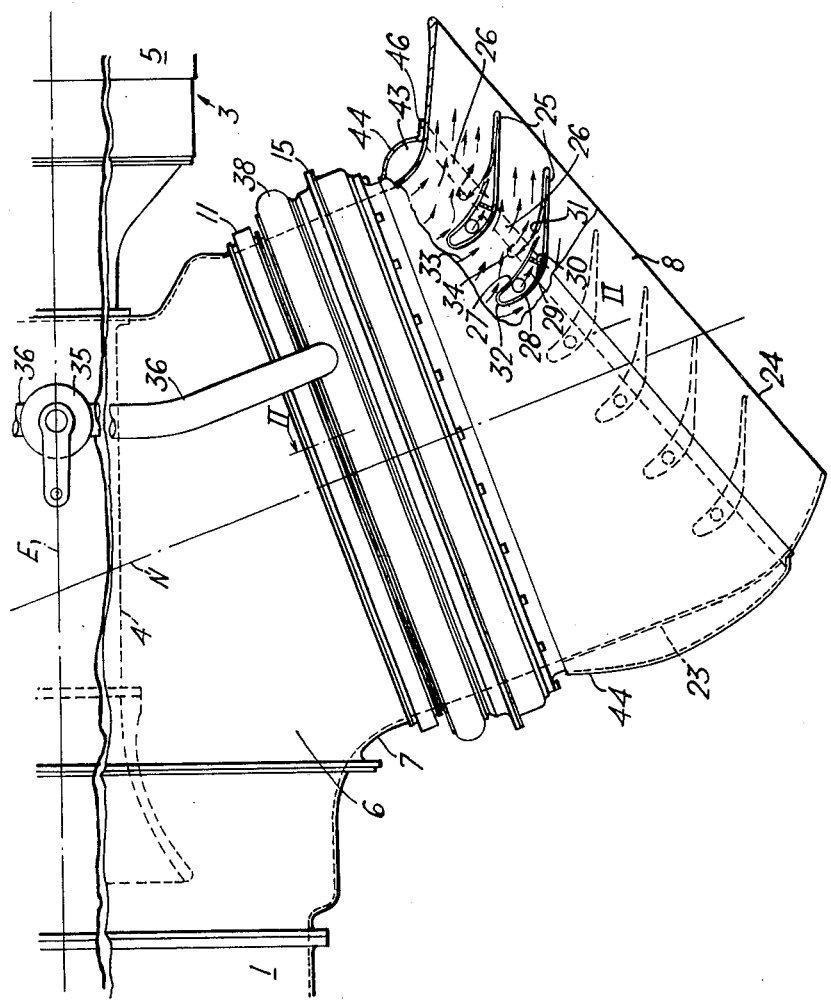
FIGURE 1 is a view of an elbow nozzle of the first mentioned form and adjacent power unit parts seen in a direction perpendicular to a plane containing the rotation axis E of the power unit and N of the nozzle, part of the nozzle being sectioned to show the arrangement of the deflector vanes.

The power unit comprises an axial flow compressor 1 at its front end and a co-axially arranged gas turbine engine 3 including a high pressure compressor 4 and a combustion chamber 5. The turbine end of the engine is not shown but includes a high pressure rotor coupled to drive the rotor of the high pressure compressor 4 and a low pressure rotor coupled to drive the rotor of the compressor 1 by a shaft which passes co-axially through the high pressure rotary assembly. Some of the air compressed by the compressor 1 is discharged into the intake of the compressor 4 for further compression, heating in the combustion chamber 5 and use for driving the gas turbine rotors, and the remainder enters an annular chamber 6 provided symmetrically on opposite sides of the vertical plane through the power unit axis E with a pair of stub outlet ducts 7. The chamber 6 is provided with combustion equipment for burning fuel in the air when adidtional power is required.

Each stub outlet duct 7 has an extension collar 10 attached to it by a clamp ring joint 11 providing a small amount of flexibility and carries a ring 12 having a transverse face 13 to which is attached by bolts 14 a support member 9 formed with an inwardly facing V-shaped bearing race groove 14 and an outwardly projecting flange 15 arranged for bolting to the aircraft structure. The race groove 14 cooperates with balls 16 running in an outwardly facing race groove 17 in a collar 18 attached by bolts 19 to the stem portion 20 of an elbow nozzle 8, the races and balls constituting a journal bearing allowing the elbow nozzle to turn around the axis N of the stub duct and of the stem portion of the nozzle.

Figure 2:
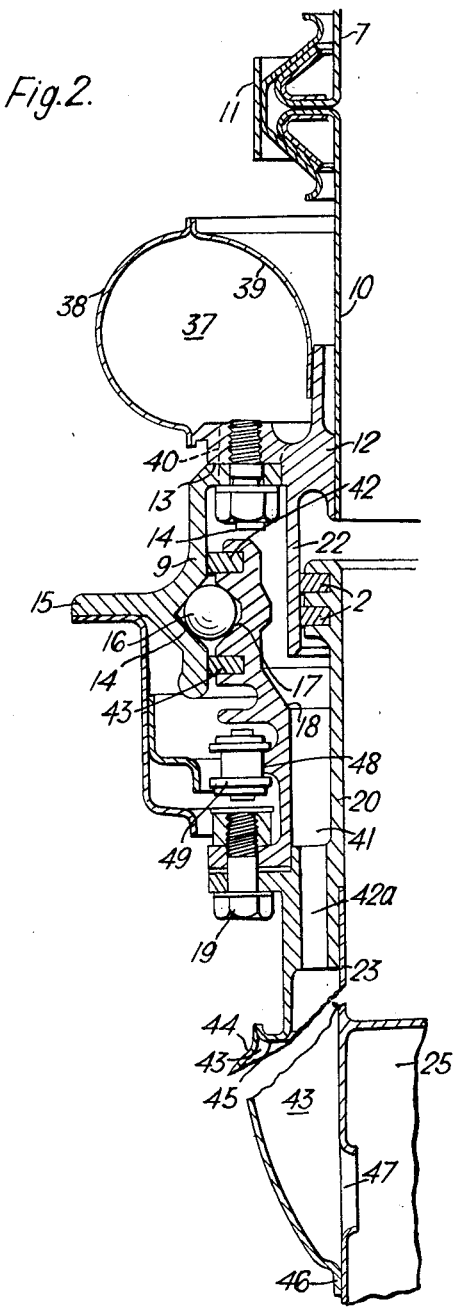
FIGURE 2 is a section on the line II—II of FIGURE 1 showing the arrangement of the bearing and secondary fluid flow passage on a larger scale.

As shown in FIGURE 2 the collar 18 is provided on its external surface with sprocket teeth 48 engaged by a chain 49. These parts are for rotating the nozzle relatively to the stub duct 7 and form no part of the present invention.

The stem portion 20 is grooved at its upstream end to receive two sealing rings 21 which bear outwardly on a tubular part 22 extending from the ring 12 in the downstream direction. Escape of air (or hot combustion products when fuel is being burnt in the chamber 6) through the joint between the collar 10 and the nozzle stem is thus prevented. The parts 7, 10 and 20 constitute parts of the main fluid flow passage of the nozzle assembly, the passage being completed by an elbow shaped duct 23 attached at its upstream end to the stem 20 and terminating at an oblique plane 24 immediately downstream of the elbow bend. A cascade of deflector vanes 25 is mounted in the bend and forms a series of throats 26 the total cross sectional area of which is less than that of the stem portion 20.

Each vane 25 extends chordwise across the elbow duct 23 and is hollow, the concave flank wall 27 being connected to the convex flank wall 28 by a stiffening diaphragm 29 provided with holes 30. The concave flank wall 27 is provided with a slit 31 extending parallel to the leading edge 32 and passing obliquely through the thickness of the wall in a direction inclined upstream so that when air is supplied to the interior of the vane at a pressure sufficiently above that of the air or gas passing through the throat 26 as indicated by arrows 33 it will be discharged part way across the throat in the form of a screen as indicated by arrows 34 and will partially block the throat and thus increase its restricting action. When the ratio of the pressure in the vane to that in the throat is below a certain value, which can be determined experimentally, the air leaving the slit is unable to penetrate the air or gas flowing through the throat and is carried downstream as a film over the concave flank of the vane without appreciably increasing the restricting action of the throat.

Air for effecting this restricting action is taken from a suitable stage of the high pressure compressor 4 through a control valve 35 and a duct 36 to each of the nozzle assemblies on opposite sides of the power unit. The duct 36, which constitutes a first part of the secondary fluid flow passage, discharges the air into an annular chamber 37 enclosed within walls 38 and 39 secured to the upstream side of the ring 12. The air then passes through openings 40 in the ring 12, arranged between bolts 14, into an annular space 41 between the collar 18 on the outside and the nozzle stem 20 and the tubular extension 22 on the inside, escape of air between the collar 18 and the support member 9 being prevented by sealing rings 42, 43 arranged one on each side of the race grooves 14 and 17. From the space 41 the air passes through a ring of holes 42a in the end of the stem 20 into a chamber 43 bounded on the inside by the elbow duct 23 and on the outside by a surrounding casing 44 secured along one edge to a flange 45 projecting from the stem 20 and along another edge 46 to the elbow duct 23 downstream of the positions at which the leading edge parts of the vanes 25 adjoin the elbow duct 23. Holes 47 in the elbow duct 23 allow air to pass from the chamber 43 into the leading edge parts of the vanes and from thence it passes through the holes 30 in the stiffening diaphragms 29 into the trailing edge parts and is discharged through the slits 31 as already described. The chambers 37 and 43, the annular space 41, the hollow interiors of the vanes 25 and the holes 40, 42, 47 and 30 constitute further parts of the secondary flow passage, while the slits 31 constitute means capable when supplied with fluid through the secondary passage of causing an increase in the restricting action of the throat. It will also be appreciated that when cool air from the compressor 4 is flowing through the annular space 41 it will form a barrier to transmission of heat to the journal bearing parts 14, 16 and 17. This protection is however required at a time when the restriction of the nozzle throat is not desired, that is to say when fuel is being burnt in the chamber 6 to heat the air discharged through the nozzle. The flow of air through the secondary passage consequently has to be reduced to a value at which the pressure ratio across the slits 31 is insufficient to cause an appreciable increase in the restricting action of the nozzle throat, but such a quantity of air is still sufficient to provide adequate protection for the journal bearing parts.

The secondary air control valve 35 is accordingly designed to have one position of adjustment in which a small flow, sufficient to cool the journal bearings, is permitted, and a second position of adjustment to provide a greater flow of air sufficient to increase the restricting effect of the nozzle throat to a value appropriate for operation without combustion of fuel in the chamber 6.

Figure 4:
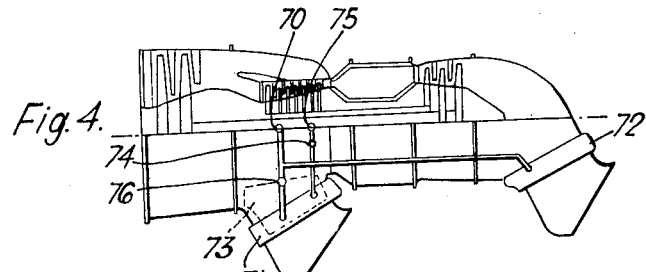

Several variations in the control system are possible. In one the compressor is tapped at a low pressure stage for supply of air merely for cooling the journal bearings and at a higher pressure stage for supply of throat-restricting air. FIGURE 4 shows one example of an engine which has a pair of air nozzles 68 and a pair of exhaust gas nozzles 69. Only one of each pair of nozzles is visible in the side elevation. Air from a tapping 70 between the first and second stages of the high pressure compressor is supplied to the manifolds 71, 72 of air and hot gas nozzles for cooling the bearings. A combustor 73 is provided for heating the air supplied to the air nozzle, but no reheat system is provided for the exhaust gas passing to the gas nozzle. To produce increased throat restriction when the combustor 73 is not operating, air is supplied to the manifold 71 through a control valve 74 from a tapping 75 between the fourth and fifth stages of the high pressure compressor. A non-return valve 76 prevents this air blowing back through the tapping 70.

Figure 5:
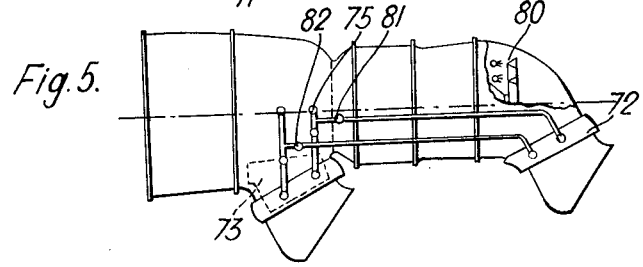

FIGURE 5 shows a similar engine but with reheat equipment 80 for the exhaust gas, the high pressure tapping 75 also supplying air through a control valve 81 to the manifold 72 of the hot gas nozzle. A separate non-return valve 82 is provided so that the combustor 73 and the reheat equipment may be used alternatively if desired.

Figure 6:
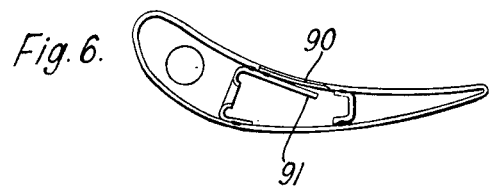
Figure 7:

In another variation the vanes 25 may be provided with a bi-metallic flank part adjacent the slit 31 arranged to increase the slit opening when the temperature falls below a selected value. An example of such a variation is shown in FIGURES 6 and 7. In the vane shown, the flank part 90 is made of bimetallic material such that at temperatures encountered when the combustor 73 is in use it takes up the position shown in FIGURE 6, the slit being substantially closed. Small notches may be provided in one edge of the slit of sufficient size to permit escape of the cooling air. When the combustor 73 is put out of operation and the air temperature therefore falls, the bimetallic part straightens to lie in contact with the flange 91 of the web member as shown in FIGURE 7, thereby opening the slit to produce the required throat restriction effect.

Figure 3:
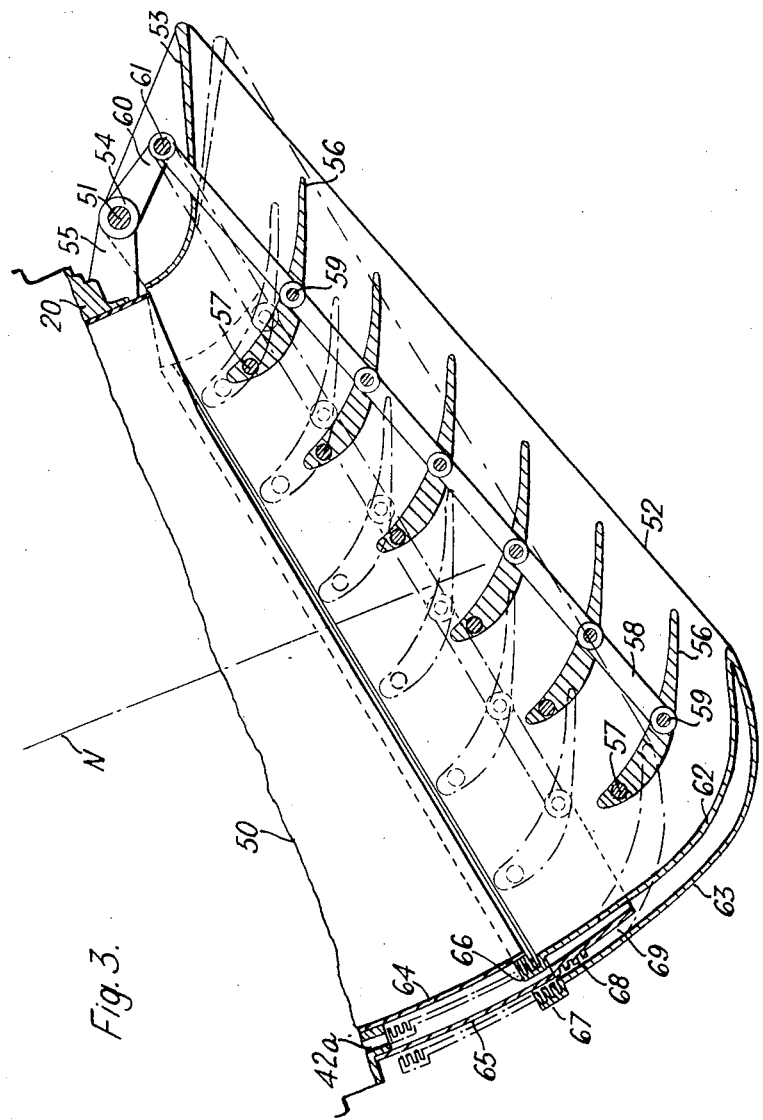
FIGURE 3 is a section through the nozzle part only of an elbow nozzle of the second mentioned form, the supply duct part being similar to that shown in FIGURES 1 and 2, and FIGURES 4 to 8 are diagrams of variants.

In the example of the second form of the invention illustrated in FIGURE 3 the nozzle part comprises a short tubular part 50, which is fixed to the stem 20 and in shape is substantially that of a segment of a toroid of circular section generated from a centre 51, and a cowl part 52 which is mounted by brackets 53 on a hinge pin 54 passing through the centre 51 perpendicularly to the plane of the toroid, the hinge pin being supported by brackets 55 projecting from the stem 20. The inlet end of the cowl part 52 is of corresponding toroidal segment shape so that it can move telescopically over the tubular part 50, but downstream of the telescoping part, and including the elbow bend, the cross-section preferably changes so that the outlet periphery is composed of opposite pairs of large radius arc joined by smaller radius corner arcs, the plane of the toroid being a plane of symmetry of the cowl intersecting a pair of the larger radius arcs at mid length positions. A plurality of deflector vanes 56 are mounted in the elbow of the cowl 52 by means of pivots 57 near their leading edges and form a cascade deflecting the issuing working fluid round the elbow bend and discharging it in the desired direction. The change of cross section of the cowl permits the vanes to be more nearly equal in length and to act on the fluid more efficiently. The vanes are maintained parallel to one another by a tie rod 58 connected to each vane by a pivot 59 and to extension 60 from the bracket 55 by a pivot 61. By means of this arrangement the direction of discharge from the vanes remains the same as the cowl 52 is telescoped over the tubular part 50 from the extended position shown in full lines to the retracted position shown in chain-dot lines, but the spacing of the vanes decreases, thereby increasing the restricting effect of the nozzle.

The aerodynamic forces acting on the vanes 56 tend to retract the cowl into the chain-dot line position in which the restriction is a maximum, and means are provided whereby a secondary flow of high pressure air from the compressor 4, turned on when fuel is being burnt in the chamber 6, projects the cowl into the full line, minimum restriction, position and at the same time provides cooling for the swivel bearing of the nozzle. For this purpose the tubular part 50 and the cowl 52 are preferably made of double walled construction over the greater part of their periphery so as to constitute a piston and cylinder arrangement. In FIGURE 3 the inner and outer walls 62 and 63 slide over the inner and outer walls 64 and 65 of the tubular part 50, labyrinth seals 66 and 67 being provided to reduce leakage. The outer wall 65 may carry an additional labyrinth seal 68 and have an extension 69 so that leakage air passing the seals 67 and 68 first traverses a greater part of the hollow wall space of the cowl 52. Alternatively, as the outer walls 63 and 65 are well cooled parts, the labyrinth seal 67 may be replaced by a sliding contact seal so as to reduce leakage to the exterior of the nozzle to a very small amount, leakage to the interior being less objectionable since part of the energy is recovered in the propulsive jet.

Figure 8:
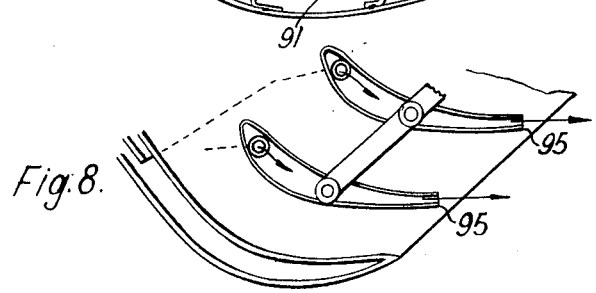

As shown in FIGURE 8, air from the hollow wall space of the cowl may be routed through the pivots 57 into the vanes 56 for cooling purposes and discharged through openings 95 in their trailing edges.

The tie rod 58, shown as passing diametrically across the cowl, may be replaced by a system of links housed in the hollow wall space of the cowl.

We claim:

1. A jet propulsion nozzle assembly comprising an outlet duct member, an elbow nozzle member communicating with said outlet duct member and defining an inner passage for discharge of a propulsion jet and an outer passage for flow of coolant at least partially surrounding the inner passage, bearing means mounting the nozzle member rotatably on the outlet duct member, said bearing means being mounted wholly externally of the outer passage, means for supplying coolant fluid to the outer passage, and means responsive to the flow of fluid in the outer passage to vary the effective area of the inner passage between a maximum value and a smaller value, said area varying means including a cascade of deflector vanes extending across the inner passage, and at least one control means for controlling the flow of fluid in the outer passage, such control means being mounted upon one only of said members.

2. A nozzle assembly according to claim 1, in which the area varying means includes means mounting the deflector vanes to turn between a position defining a maximum throat area and a position defining a smaller throat area, and means for turning the vanes in response to variation in fluid pressure in the outer passage.

3. A nozzle assembly according to claim 2, in which the nozzle member comprises a short tubular part and a cowl part which have telescoping toroidal segments, the vanes being mounted to pivot relatively to the cowl part, a pivot which is fixed relatively to the tubular part, and a tie rod connecting the vanes to the pivot whereby telescoping of the cowl part and the tubular part causes a decrease in the spacing between the vanes, while the direction of discharge from the vanes remains the same.

4. A nozzle assembly according to claim 3 including means defining a leakage path for coolant fluid from the outer passage to the inner passage at the junction of the tubular part and the cowl part.

5. A jet propulsion nozzle assembly comprising an elbow nozzle defining an inner passage for discharge of a propulsive jet and a surrounding outer annular passage for flow of coolant, bearing means for the nozzle mounted wholly externally of the outer passage, a cascade of deflector vanes extending across the inner passage and defining a throat of the nozzle, means for supplying coolant fluid to the outer passage at a flow rate not less than a predetermined minimum, and means in communication with the outer passage and associated with the vanes to vary the effective area of the throat between a maximum value and a smaller value, wherein each vane is hollow and curved with its interior in communication with the outer passage, and has, in its concave flank, a slit extending substantially parallel to its leading edge, the slit constituting a nozzle the discharge direction of which is inclined upstream.

6. A nozzle assembly according to claim 5 in which each vane includes a temperature-sensitive element controlling the width of the slit.

7. A jet propulsion engine including low-pressure air compressor means for delivering air partly to a high-pressure air compressor and partly to a chamber containing fuel combustion equipment, a nozzle assembly according to claim 5, arranged to receive air from the chamber, and a connection, including valve means, between the high-pressure compressor and the outer passage, the valve being arranged to have one position of adjustment in which a small flow, sufficient to cool the bearing means, is permitted, and a second position of adjustment to provide a greater flow of air sufficient to increase the restricting effect of the nozzle throat to a value appropriate for operation without combustion of fuel in the chamber.

8. A jet propulsion engine including low-pressure air compressor means for delivering air partly to a high-pressure air compressor and partly to a chamber containing fuel combustion equipment, a nozzle assembly according to claim 5, arranged to receive air from the chamber, spaced tappings on the high pressure compressor and the secondary fluid flow passage, and two connections, each including valve means, between said tappings.

References Cited by the Examiner

UNITED STATES PATENTS

| 2,630,673 | 3/53 | Woll | 60—35.6 X |
| 2,699,647 | 1/55 | Goebel. | |
| 2,879,014 | 3/59 | Smith et al. | 60—35.54 X |
| 2,961,198 | 11/60 | Stevens | 60—35.6 X |
| 3,028,121 | 4/62 | Klapproth | 244—23 |
| 3,038,305 | 6/62 | Price | 60—35.55 |

FOREIGN PATENTS 755,019  8/56  Great Britain.

SAMUEL LEVINE, *Primary Examiner.*